United States Patent
Foxx et al.

(10) Patent No.: US 9,951,887 B2
(45) Date of Patent: Apr. 24, 2018

(54) PIPE CLAMP COMBINATION

(71) Applicant: Strato, Inc., Piscataway, NJ (US)

(72) Inventors: Michael J. Foxx, Hillsborough, NJ (US); Zhen Liu, Montgomery, NJ (US); Jennifer Mak, Bridgewater, NJ (US); Larry Hixon, Pittstown, NJ (US)

(73) Assignee: STRATO, INC., Piscataway, NJ (US)

( * ) Notice: Subject to any disclaimer, the term of this patent is extended or adjusted under 35 U.S.C. 154(b) by 0 days.

(21) Appl. No.: 15/134,870

(22) Filed: Apr. 21, 2016

(65) Prior Publication Data

US 2017/0089490 A1    Mar. 30, 2017

Related U.S. Application Data

(60) Provisional application No. 62/204,179, filed on Aug. 12, 2015.

(51) Int. Cl.
| | |
|---|---|
| *F16L 5/00* | (2006.01) |
| *F16L 3/10* | (2006.01) |
| *F16B 2/14* | (2006.01) |
| *B61D 49/00* | (2006.01) |

(52) U.S. Cl.
CPC .............. *F16L 3/10* (2013.01); *B61D 49/00* (2013.01); *F16B 2/14* (2013.01)

(58) Field of Classification Search
USPC .......... 248/49, 58, 60, 62, 63, 73, 74.1, 74.2
See application file for complete search history.

(56) References Cited

U.S. PATENT DOCUMENTS

| | | | | |
|---|---|---|---|---|
| 1,821,295 A | * | 9/1931 | Dieter | F16L 3/00 126/317 |
| 2,546,792 A | * | 3/1951 | Smith | F16L 3/24 248/56 |
| 2,625,354 A | * | 1/1953 | Smith | B60T 17/046 248/56 |
| 4,222,538 A | * | 9/1980 | Jensen | B60T 17/046 248/56 |
| 5,370,344 A | * | 12/1994 | Nadherny | F16L 3/24 248/548 |

(Continued)

*Primary Examiner* — Terrell L McKinnon
*Assistant Examiner* — Michael McDuffie
(74) *Attorney, Agent, or Firm* — Pearl Cohen Zedek Latzer Baratz LLP

(57) ABSTRACT

A pipe clamp wedge is disclosed that can be used with an existing pipe clamp anchor to secure a brake line pipe to a rail car. The wedge has a cradle portion having a concave side receiving the pipe, and a convex wedge side opposite the concave side. The cradle portion has a height increasing in a longitudinal direction, and a pair of opposed channels on lateral sides of the wedge are adapted to receive tabs on the pipe anchor. A pair of tabs on the wedge extends in the opposite direction from the tabs on the pipe anchor on either side of the cradle portion. Thus, the wedge can be slid onto the anchor, tightening around the pipe as the wedge moves in the longitudinal direction onto the anchor, and the wedge is dimensioned so that when the wedge cannot move further, the tabs on the wedge extend beyond the pipe anchor and may be bent up (toward the railcar) to secure the wedge. The parts of the combination are adapted so that sliding the pipe onto the anchor and bending the tabs may be done with a hammer.

15 Claims, 2 Drawing Sheets

(56) References Cited

U.S. PATENT DOCUMENTS

| | | | | |
|---|---|---|---|---|
| 5,395,079 A | * | 3/1995 | Jensen | F16L 3/10 |
| | | | | 248/62 |
| 5,472,158 A | | 12/1995 | Nadherny | |
| 5,605,309 A | * | 2/1997 | Nadherny | F16L 3/10 |
| | | | | 248/62 |
| 5,624,089 A | * | 4/1997 | Nadherny | B60T 17/046 |
| | | | | 248/62 |
| 5,743,498 A | * | 4/1998 | Kampf | F16L 3/24 |
| | | | | 248/62 |
| D426,454 S | * | 6/2000 | Kampf | D8/380 |
| 8,371,544 B2 | | 2/2013 | Heitmeyer | |

\* cited by examiner

PIPE CLAMP COMBINATION

CROSS-REFERENCE TO RELATED APPLICATIONS

This application claims the benefit of U.S. Provisional Application No. 62/204,179, filed Aug. 12, 2015, which is incorporated herein by reference in its entirety.

FIELD OF THE INVENTION

The invention relates to a pipe clamp for a railway car brake line. Specifically, the invention relates to a novel pipe clamp wedge which can be secured to a conventional pipe clamp anchor base welded to a railcar, and a brake line pipe received therein, without deforming the anchor.

BACKGROUND OF THE INVENTION

A conventional pipe clamp comprises a cast, forged, stamped or fabricated pipe anchor (sometimes referred to as a "base") which is welded to a railway car body to hold a brake line. Conventionally, a wedge is slid over pipe clamp tabs provided on the anchor, and tabs on the anchor are hammered up (toward the car body) to lock the wedge in place. One problem with the conventional pipe clamps is that tabs on the anchor tend to snap off due to metal cracking, and welding is required to remove and/or replace the pipe clamp anchor, which can be time consuming and costly.

U.S. Pat. No. 8,371,544 to Heitmeyer and U.S. Pat. No. 5,472,158 to Nadherny are incorporated by reference for their disclosure of pipe clamps, including pipe anchors, and pipe clamp wedges. Prior art designs in which locking elements are provided on a clamp have the tabs positioned inconveniently, and have not been adapted for use with existing anchors.

SUMMARY OF THE INVENTION

In one aspect, the invention is a pipe clamp wedge, comprising: a cradle portion having a longitudinal axis and adapted to receive a pipe. The cradle has a concave side receiving the pipe and a convex wedge side opposite the concave side. The cradle portion has a height increasing in a longitudinal direction. A pair of opposed channels on lateral sides of the wedge are adapted to receive a pipe anchor, and a pair of tabs extends on either side of the cradle portion from a longitudinal end of the pipe clamp where the cradle portion has the greatest height, adapted to be bent to secure the wedge to the anchor and to the pipe.

Thus, the wedge can be slid onto the anchor, tightening around the pipe as the wedge moves in the longitudinal direction onto the anchor, and the wedge is dimensioned so that when the wedge cannot move further, the tabs on the wedge extend beyond the pipe anchor and may be bent up to secure the wedge. Sliding the pipe onto the anchor and bending the tabs may be done with a hammer. One side of the wedge, opposite the tabs, is provided with a bent section or "heel", which an installer can use to hammer the wedge into place on the anchor.

In another aspect, the invention is a combination of the novel pipe wedge with an existing pipe anchor to reduce or eliminate strain on the pipe anchor caused by using the anchor tabs to lock the clamp into place around a pipe. In this aspect, the tabs on a conventional pipe anchor extend in a direction opposite to the direction of the tabs on the novel pipe clamp wedge.

The Figures are schematic and not drawn to scale. Some features, not necessary for an understanding of the invention, may be omitted in certain views to better illustrate other features.

DETAILED DESCRIPTION OF THE INVENTION

Figure 1:
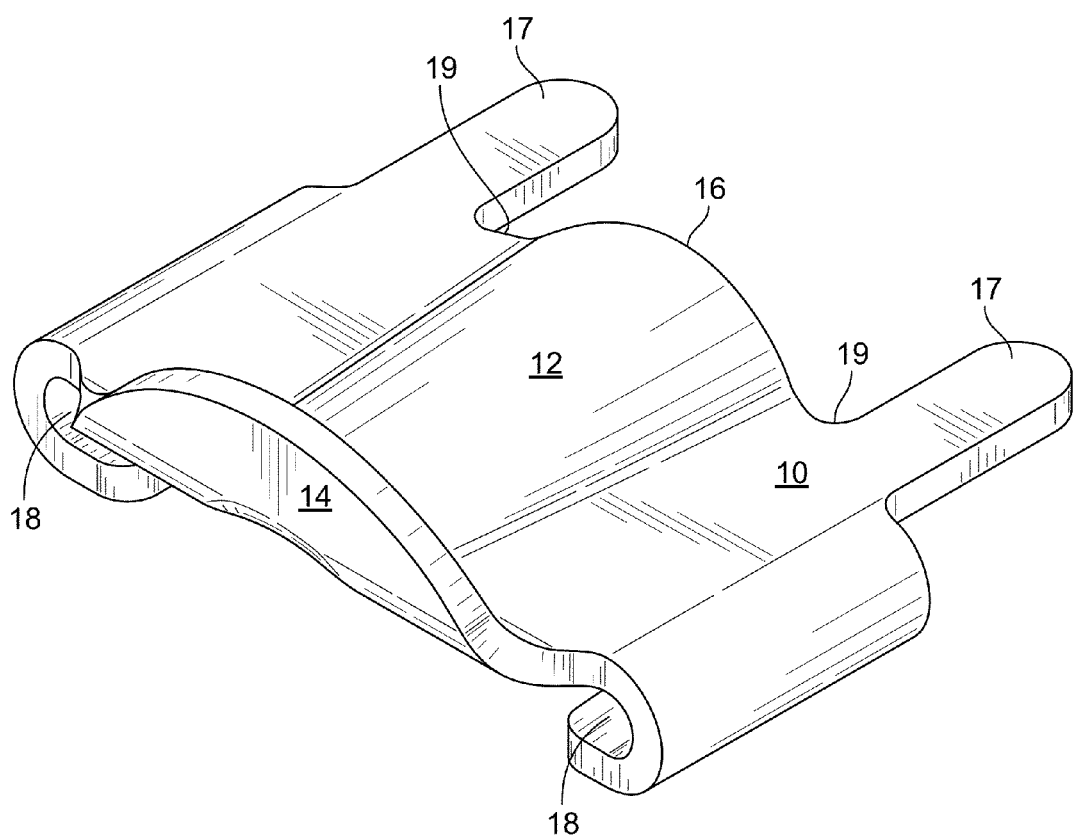
FIG. 1 depicts a pipe clamp wedge according to an embodiment of the invention.

FIG. 1 depicts a pipe clamp wedge 10 comprising: a cradle portion 12 having a longitudinal axis parallel to the longitudinal axis of a pipe installed therein. In FIG. 1, a convex wedge side of the cradle portion is showing. The convex wedge side of the cradle portion 12 has a height increasing in a longitudinal direction, from heel 14 at one end of the pipe clamp wedge 10 to a high point at an opposite peripheral edge 16 of the longitudinal end of cradle body portion 12. Pipe clamp wedge 10 also has a pair of opposed channels 18 on lateral sides of the wedge adapted to receive a pipe anchor. A pair of tabs 17 extends from a longitudinal end of the pipe clamp wedge 10, on either side of the peripheral edge 16 of cradle portion 12. Tabs 17 are long enough that they can be bent toward the body of pipe clamp anchor 20 (shown in FIG. 2) to secure the wedge 10 to the anchor, but not so long that they would extend in a vertical direction beyond anchor 20 when completely bent toward the anchor.

The pipe clamp wedge 10 is typically (but not necessarily) fabricated, such as by stamping, from a single piece of metal, which may be steel, stainless steel, or other metal. Preferably, the clamp is steel with a zinc coating for corrosion resistance. The thickness of wedge 10 may be uniform throughout the part, in a range of 0.1 to about 0.2 inches in thickness depending on the size of the anchor to be accommodated. ASTM A-36 steel, or alternatively ASTM A-283 Grade B steel, have been shown to provide sufficient strength at this thickness and still allow for bending tabs 17 by striking with a hammer. Heel 14 extends almost perpendicularly from one end of clamp wedge 10, so that during installation, a hammer can be used to drive the wedge onto the anchor to secure a pipe. "Almost perpendicular" in this context allows for a curved portion where the heel meets the body of the wedge, and allows some deviation (+/−10°) from perpendicular that will still allow heel 14 to provide sufficient purchase for a hammer.

Pipe clamp wedge 10 is adapted to cooperate with an appropriately sized anchor to secure a pipe, typically ⅜ inch, ½ inch, ¾ inch, 1 inch, or 1¼ inch pipe. The radius of the cradle and the distance between the tabs is sized accordingly. Thus, depending on the height of anchor body 20, tabs 17 may extend 1.0 to 1.5 inches from the end of the body of cradle 12.

Wedge 10 may be modified to improve resistance to cracking by including a radius at inside corners 19 where tabs 17 meet the body of the wedge. Likewise, peripheral 16 may curve outwardly, between tabs 17, with a radius of 1.0 to 1.5 inches, such that corners 19 may have a radius of ¼ inch to ½ inch. Edges of the wedge 10 meeting the pipe, including peripheral edge 16, may be chamfered forming an oblique angle of (for example) 135 degrees where the edge of the wedge meets the pipe, which chamfer (not shown in the drawings) may also improve resistance to cracking. End surfaces of tabs 17 are curved, for example (and not by way of limitation) with a radius of ⁵⁄₁₆ inch so that no sharp edges extend from the wedge when installed on a pipe anchor.

Figure 2:
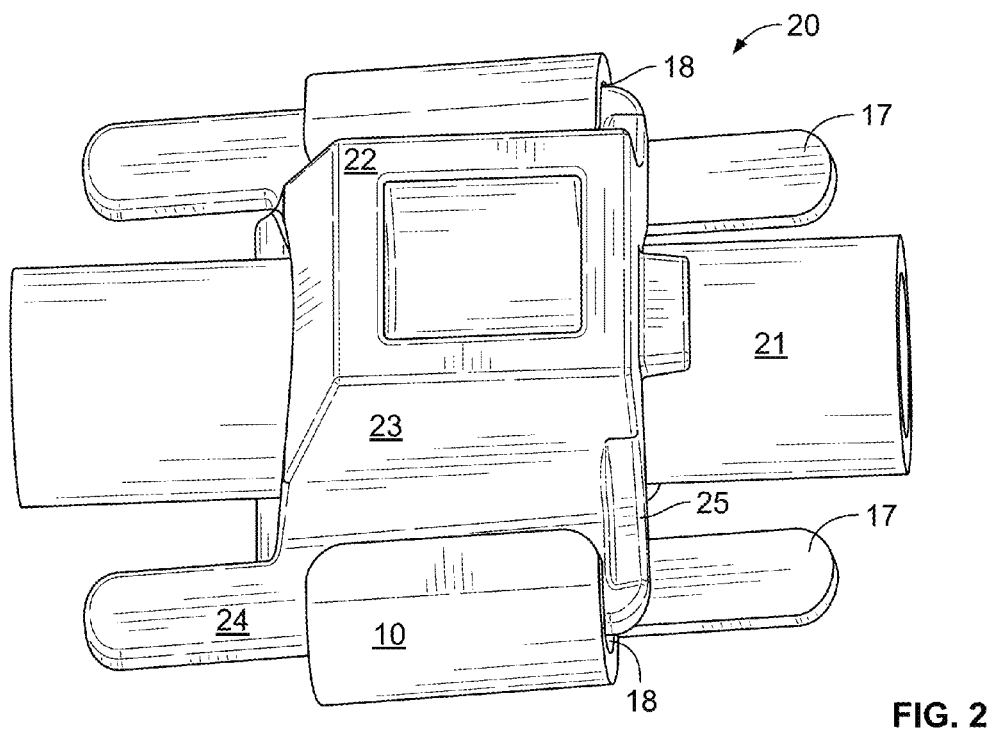
FIG. 2 depicts a pipe clamp combination according to an embodiment of the invention installed on a pipe.

FIG. 2 depicts a pipe clamp anchor 20 having body sides 23 and an attachment portion 22. Anchor 20 is typically (but not necessarily) a cast part, and attachment is typically (but not necessarily) made by welding anchor 20 to the railcar body (not shown) at attachment portion 22. Brake line pipe 21 is received in a curved portion of anchor 20 between body sides 23 of anchor 20. Anchor tabs 24 are integral with anchor 20. The anchor tabs extend from and are integral with corresponding ledges formed on the sides of the anchor body which are received in the respective channels on the wedge. Tabs 24 are received in channels 18 when wedge 10 is installed on anchor 20, such that tabs 17 extend in an opposite direction from tabs 24. An advantage of having tabs 17 in this position is that the clamp can be secured by bending tabs 17, without deforming anchor 20, thus extending life of the anchor. A further advantage of the clamp wedge 10 according to the invention is that wedge 10 is provided with channels 18 adapted to receive conventional anchor tabs 24. In other words, the novel clamp wedge according to the invention will easily be combined with presently existing brake line fixtures.

To install a pipe clamp according to the invention, the user welds a pipe anchor 20 to a car body in a position where a brake line pipe is desired to be secured. Channels 18 of wedge 10 slide over anchor tabs 24 and wedge 10 may be hammered on heel 14 so that pipe 21 is wedged between wedge 10 and anchor 20 with a snug fit, for example until wedge 10 abuts stops 25 on the anchor. In this position, tabs 17 on wedge 10 can be hammered toward anchor 20.

Figure 3:
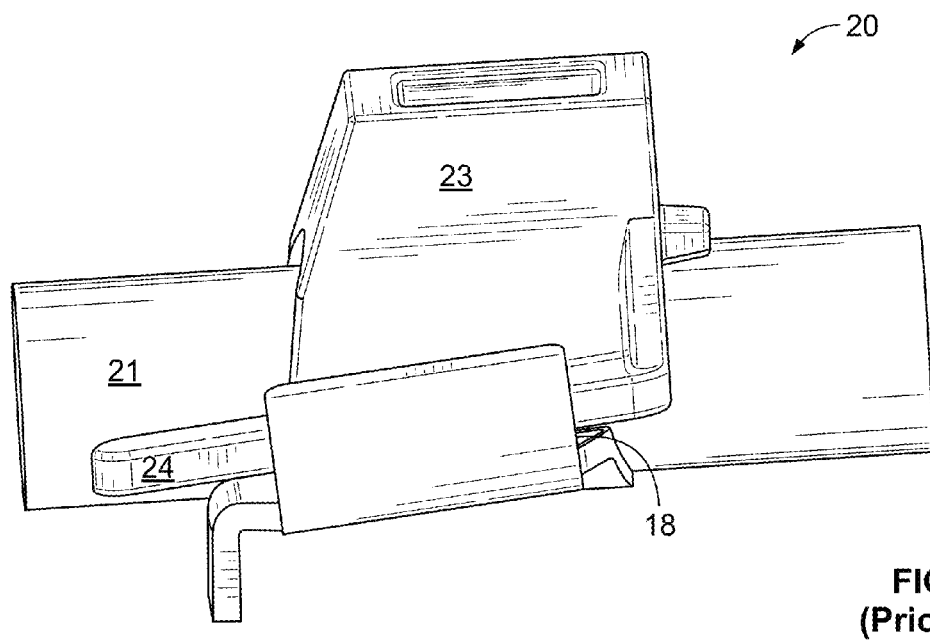
FIG. 3 depicts a pipe clamp combination according to the prior art.

In the prior art shown in FIG. 3, securing a wedge to a pipe anchor required deforming tabs 24. With the tabs 17 provided on the wedge, according to the invention, when a tab breaks, only the wedge will need to be replaced. As a result, pipe clamps will have a much longer life, since tabs on the anchor do not have to be bent. Modifications to the shape of the wedge ensure some resistance to cracking, allowing the life cycle of the combination to be extended.

The description of the foregoing preferred embodiments is not to be considered as limiting the invention, which is defined according to the appended claims. The person of ordinary skill in the art, relying on the foregoing disclosure, may practice variants of the embodiments described without departing from the scope of the invention claimed. A feature or dependent claim limitation described in connection with one embodiment or independent claim may be adapted for use with another embodiment or independent claim, without departing from the scope of the invention.

What is claimed is:

1. A pipe clamp wedge formed of a single piece of metal, comprising: a cradle portion having a longitudinal axis, a concave side of the cradle portion adapted to receive a pipe, and a convex wedge side opposite the concave side, said convex wedge side of the cradle portion having a height increasing in a longitudinal direction; a pair of opposed channels on lateral sides of the wedge adapted to receive a pipe anchor, and a pair of tabs extending from a longitudinal end of the pipe clamp wedge on either side of the cradle portion where the height is greatest, each tab being between said cradle portion and said channel, and being adapted to be bent toward the anchor in an installed position to secure the anchor to the wedge and to the pipe; and wherein the opposed channels are formed on opposite lateral sides of the wedge from a respective single fold in the piece of metal, each said fold forming a "U" shape, having a first side of the "U" shape in a first plane on a first side of the fold, and a second side of the "U" shape in a second plane, parallel to said first plane on a second side of the fold opposite said first side of the fold; and wherein the second side of the fold is a free end, and wherein the tabs extend from the wedge in said first plane on the first side of the "U" shape between the cradle portion and the fold.

2. The pipe clamp wedge according to claim 1, wherein the pipe clamp wedge is a single fabricated metal piece made by stamping.

3. The pipe clamp wedge according to claim 1, having a heel at one end substantially perpendicular to and extending away from the convex wedge side of the cradle portion and forming a wall, and wherein said pair of tabs extends from an end of the pipe clamp wedge opposite the heel.

4. The pipe clamp wedge according to claim 2, wherein the pipe clamp wedge comprises steel, having a thickness in a range of 0.1 inches to 0.2 inches.

5. The pipe clamp wedge according to claim 3, wherein the heel has a curved peripheral edge.

6. The pipe clamp wedge according to claim 1, wherein the peripheral edge of the pipe clamp wedge between the tabs has an outward curve portion and a corner where each tab meets the peripheral edge of the pipe clamp wedge at the outward curve portion between the tabs has a radius of ¼ to ½ inch.

7. A pipe clamp combination for securing a brake line pipe to a railcar body, comprising:
   an anchor having a body and a flat attachment surface on one side of the body for attachment to a railcar, a curved surface on a side of the body opposite the attachment surface for receiving a brake line pipe, and anchor tabs integral with the anchor extending away from the body of the anchor on opposite sides of the curved surface; and
   a pipe clamp wedge having a cradle portion with a longitudinal axis, a concave side of the cradle adapted to face the curved surface of the anchor and to receive a pipe between the anchor and the wedge, the cradle having convex side opposite the concave side and having a height increasing in a longitudinal direction; a pair of opposed channels on lateral sides of the wedge adapted to receive the anchor tabs, and a pair of wedge tabs extending from a side of the wedge in a direction opposite the anchor tabs; and wherein the opposed channels are formed on opposite lateral sides of the wedge from a respective single fold in the piece of metal, each said fold forming a "U" shape, having a first side of the "U" shape in a first plane on a first side of the fold, and a second side of the "U" shape in a second plane, parallel to said first plane on a second side of the fold opposite said first side of the fold; and wherein the second side of the fold is a free end, and wherein the wedge tabs extend from the wedge in said first plane on the first side of the "U" shape between the cradle portion and the fold;
   wherein the wedge tabs are adapted to extend beyond the anchor when the wedge is installed on the anchor and adapted to be bent in the direction of the anchor.

8. The pipe clamp combination according to claim 7, wherein the anchor tabs extend from and are integral with corresponding ledges formed on the sides of the anchor body which are received in the respective channels on the wedge.

9. The pipe clamp combination according to claim 7, further comprising travel stops at the end of each ledge opposite the respective anchor tabs, said travel stop abutting an end of the respective channel on the pipe clamp wedge.

10. The pipe clamp combination according to claim 7, wherein the pipe clamp wedge is a single fabricated steel piece having a thickness in a range of 0.1 to 0.2 inches.

11. The pipe clamp combination according to claim 7, wherein the anchor is cast, stamped, forged or fabricated metal.

12. The pipe clamp combination according to claim 7, wherein the clamp is provided with a heel at one end substantially perpendicular to and extending away from the convex wedge side of the cradle portion and forming a wall, adapted so that the wedge can be urged on to the anchor with a hammer.

13. The pipe clamp combination according to claim 7, wherein the peripheral edge of the pipe clamp wedge between the wedge tabs has an outward curve portion and a corner where each wedge tab meets the peripheral edge of the pipe clamp wedge at the outward curve portion between the tabs has a radius of ¼ to ½ inch.

14. The pipe clamp wedge according to claim 1, wherein the ends of the tabs are curved.

15. The pipe clamp combination according to claim 7, wherein the ends of the wedge tabs are curved.

* * * * *